United States Patent [19]
Dunn et al.

[11] Patent Number: 5,873,040
[45] Date of Patent: Feb. 16, 1999

[54] WIRELESS 911 EMERGENCY LOCATION

[75] Inventors: James M. Dunn, Ocean Ridge; Edith Helen Stern, Boca Raton, both of Fla.

[73] Assignee: International Business Machines Corporation, Armonk, N.Y.

[21] Appl. No.: 698,012

[22] Filed: Aug. 13, 1996

[51] Int. Cl.[6] .................................................. H04Q 7/32
[52] U.S. Cl. .......................... 455/456; 455/404; 455/457
[58] Field of Search .................................... 455/456, 457, 455/404, 564, 561, 31.1, 31.3, 38.3; 342/126, 450; 340/539, 825.49

[56] References Cited

U.S. PATENT DOCUMENTS

| | | | |
|---|---|---|---|
| 4,599,490 | 7/1986 | Cornell et al. | 455/414 |
| 4,644,351 | 2/1987 | Zabarsky et al. | 455/507 |
| 4,788,711 | 11/1988 | Nasco, Jr. et al. . | |
| 5,023,900 | 6/1991 | Tayloe et al. . | |
| 5,161,180 | 11/1992 | Chavous . | |
| 5,195,126 | 3/1993 | Carrier et al. . | |
| 5,247,564 | 9/1993 | Zicker | 455/419 |
| 5,293,642 | 3/1994 | Lo . | |
| 5,327,144 | 7/1994 | Stilp et al. . | |
| 5,347,568 | 9/1994 | Moody et al. . | |
| 5,388,147 | 2/1995 | Grimes . | |
| 5,418,843 | 5/1995 | Stjernholm . | |
| 5,444,760 | 8/1995 | Russ . | |
| 5,454,024 | 9/1995 | Lebowitz | 455/404 |
| 5,465,388 | 11/1995 | Zicker . | |
| 5,465,390 | 11/1995 | Cohen . | |
| 5,479,482 | 12/1995 | Grimes . | |
| 5,513,111 | 4/1996 | Wortham . | |
| 5,513,243 | 4/1996 | Kage . | |
| 5,513,246 | 4/1996 | Honsson et al. . | |
| 5,515,419 | 5/1996 | Sheffer | 455/521 |
| 5,548,583 | 2/1995 | Bustamante | 455/561 |
| 5,574,771 | 11/1996 | Driessen et al. | 455/557 |
| 5,631,635 | 5/1997 | Robertson et al. | 455/31.1 |
| 5,633,915 | 5/1997 | Yang et al. | 455/443 |
| 5,649,291 | 7/1997 | Tayloe | 455/437 |
| 5,673,308 | 9/1997 | Akhavan | 455/462 |
| 5,689,807 | 11/1997 | Wong et al. | 455/38.1 |
| 5,721,733 | 2/1998 | Wang et al. | 370/332 |

OTHER PUBLICATIONS

Clement Driscoll, Locating wireless 911 callers, Jul. 1995.

*Primary Examiner*—Dwayne D. Bost
*Assistant Examiner*—Jean A. Gelin
*Attorney, Agent, or Firm*—Richard A. Tomlin; Robert Lieber

[57] ABSTRACT

A system arrangement and method are disclosed for determining location of a wireless mobile unit involved in a call for public emergency assistance (e.g. a "911" call). The system is cost-effective in that it makes extensive use of existing telecommunication infrastructures, and does not require either special hardware or software at either the mobile unit site or the emergency assistance center handling a call. The system features shared use of a computer and specially defined database among a plurality of mobile switching offices serving a larger plurality of mobile base stations, the latter serving an even larger plurality of antenna and transceiving sites within predefined cellular regions. Signal strength measurements at the base stations are passed through the switching offices to a shared computer, and the latter uses the measurements to calculate a small area for which it would be practical to conduct a search if the mobile unit user requiring assistance is unable to help in determining his/her location. The calculated area and database are used to furnish the emergency assistance center handling the call with a detailed mapping of the calculated area, highlighting specific features (terrain, buildings, signs, etc.) that could be used to question the caller in a manner likely to produce responses from which the caller's location could be either precisely fixed or at least narrowed to a small part of the mapped area.

5 Claims, 2 Drawing Sheets

Legend
1 - Mobile/wireless Unit
2, 3 - Regional/Cell Antennas
4 - Base Station
5 - Switching Office
6 - Public Switched Tel. Network
7,8 - Emergency (e.g. 911) Operators
9 - Controller/Computer
10 - Database (with details of cell geographic and other parameters)

Legend
1 - Mobile/wireless Unit
2, 3 - Regional/Cell Antennas
4 - Base Station
5 - Switching Office
6 - Public Switched Tel. Network
7,8 - Emergency (e.g. 911) Operators
9 - Controller/Computer
10 - Database (with details of cell geographic and other parameters)

WIRELESS 911 EMERGENCY LOCATION

BACKGROUND OF THE INVENTION

In the reception and handling of 911 emergency telephone calls, it is important to be able to automatically pinpoint the location of a caller; e.g. an anxious or hysterical caller unable to tell his or her location, or a caller that does not know his/her location and has no visible landmarks that could be used to fully identify such. In calls over ordinary telephone sets directly linked by wire to the Public Switched Telephone Network (hereafter, PSTN), it is possible to trace the number of the telephone from which the call is placed and use that information to locate the caller, since the calling device or unit is associated with a known "building" address from which the caller's location is easily implied or determinable.

However, this is not possible when the respective calling unit is mobile; e.g. a cellular telephone or a "2-way" pager. Mobile units of this kind generally link to the PSTN through a network of geographically dispersed antennas, base stations and switching offices. Although such units have an identity which is signalled during a call, that identity neither implies their physical location nor forms a basis for calculating it. Furthermore, even if the locations of the antennas and distances between them are known, that information per se does not form a basis for determining the location of a unit with which they are currently communicating.

The problem we are concerned with presently is that of obtaining sufficient information about approximate locations of mobile units involved in critical situations (911 calls, emissions from stolen vehicles, etc.), to enable operators on the PSTN to dispatch personnel (rescue workers, firemen, policemen, etc.) with a fair probability of the latter being able to successfully locate respective units. Another problem we are concerned with here is that of providing the foregoing services in a cost-effective manner which places minimal burdens (financial or other) on users of otherwise inexpensive mobile units.

Prior art GPS (Global Positioning System) arrangements are known wherein mobile units involved in public emergency (911) call situations can establish their geographic locations and relay that information to public emergency operators/centers. However, such mobile units require complex radio links to earth satellites, and therefore tend to be too expensive to be used by more than a very small percentage of users involved in such situations.

Other known prior art describes techniques for determining approximate locations of mobile units wherein the determination is made wholly within the existing infrastructure serving such units and require minimal information from the units themselves. However, this art does not concern itself with application of respective techniques to location of callers involved in emergency situations, and their levels of accuracy are considered too low to have useful application to more than a very small percentage of emergency call situations involving mobile units.

Our invention provides a cost-effective technique for determining approximate locations of mobile units, which has practical applications to public emergency calls and other critical situations involving virtually all users of such units, and which is not dependent for practicality upon having the users per se supply information relative to their locations.

SUMMARY OF THE INVENTION

In accordance with our invention, approximate locations of existing (and future) mobile units involved in public emergency situations are determinable in a fairly practical manner by using signal strength information detected within the communication infrastructure currently in communicating range of the calling unit, in combination with special database information included in computing equipment linked to the respective infrastructure. These infrastructures generally consist of radio antennas within listening range of a mobile unit originating a public emergency/911 call, base stations linked to those antennas, and switching offices linking the base stations with the PSTN.

The special database information referred to above includes relevant information about the region encompassed by each antenna; particularly, defining highways, streets, mountains, rivers, building structures, etc., pertinent to each region. The signal strength information obtained from the in-range antennas and their base stations is used to calculate a small circular area in which the calling unit is believed to be located. Information describing that area is passed to the public emergency operator (or assistance center) via the PSTN, along with data extracted from the special database. Using the latter data emergency operators can interact with users of respective mobile units to ask questions about significant landmarks currently visible to those users (street signs, buildings, hotels, mountains, hills, streams, etc.), with responses to those questions greatly increasing the likelihood of locating respective users. The operators can then dispatch rescue (or other) workers to respective users with corresponding increased likelihood of the latter being able to quickly locate respective users.

In the initial handling of this process, network controllers, containing switching offices that interface between the PSTN and base stations within listening range of a mobile unit issuing a public emergency/911 call, interact with the base stations to determine strengths of signals received at the base stations from the respective mobile unit. In a described preferred embodiment, this interaction involves assignment of primary tracking responsibility to one in-range station (usually, a station receiving a strongest signal, although current signal traffic and other circumstances may require that responsibility to be shifted elsewhere) and secondary tracking responsibilities to other in-range stations.

Base stations assigned these responsibilities individually monitor transmissions received by their associated antennas from the respective mobile unit; particularly seeking to detect identity (ID) signals, usually sent by the respective unit embedded within its transmissions, and strengths of such ID signals as received. As these ID's and their signal strengths are detected, messages are sent to the network controller, each message furnishing information identifying the receiving antenna, the mobile unit ID and the currently measured signal strength of that unit. In addition to performing these functions, the station having primary tracking responsibility passes all other signals received from the mobile unit to the switching office contained in the network controller for transmittal by that office to the PSTN.

The network controller, or its supporting computer, uses the information identifying participating antennas to ascertain locations of respective antennas, and the signal strength information associated with those antennas to calculate a circular area in which the mobile unit is located. That area is much smaller than the area encompassed by any antenna, but possibly too large to be useful in a practical sense for locating the mobile caller. Using this area information, the database is accessed to extract geographic and other parameters information and other data pertinent exclusively to that area. The area information and extracted data are then passed via the PSTN to the emergency assistance center. At the latter location, the extracted data can be used by assistance operators processing a public emergency call to ask specific questions of a caller about landmarks (hotels, signs, street names, etc.) and the like that the caller may currently be able to see or otherwise identify. Responses to these specific questions enable the operator(s) to considerably reduce the circular area to a smaller one in which there is a high probability that dispatched personnel would quickly find (and help) the caller.

The size of the circular area initially established from the signal strength measurements, and therefore the intrinsic pertinence of that information to the user's actual location, depends on a number of factors; for example, the number of antennas and base stations participating in the process, weather conditions present during the call, etc. Nevertheless, in many instances, this information per se could be useful to enable dispatched personnel (rescue workers, police, etc.) to locate the calling unit and its user. Furthermore, if the calling party is able to provide relevant information in response to specific questions asked by a public emergency operator (e.g. noticeable landmarks, street signs, etc.), that information should be useful to determine a smaller area, within the originally calculated circular area, in which the caller is probably located.

An important advantage of this system is that it makes extensive use of existing mobile communication infrastructures associated with extensively used mobile units, and therefore provides cost effective emergency location service to a large number of potential users. Another advantage is that it does not require either the caller or the public assistance operator receiving the call to have special hardware or software.

The database used for extracting parameters relevant to an initially calculated circular area should include information available from regional maps and additional information identifying geographic locations of specific landmarks, buildings, and other topographical structures within each mapped region.

Furthermore, if the tracking network uses currently new "steerable" antennas, rather than the omnidirectional antennas commonly used in existing mobile systems, the accuracy of location with presently defined techniques could be greatly increased.

Other features of wireless systems could also be used to improve accuracy. For example, most existing mobile units (both for telephone speech and 2-way paging) have a constantly active "command" channel (one that is "on" as long as the unit is powered on). That channel is useful for tracking as the user roams (e.g. moves between regions receiving primary coverage from different antennas). Information obtained through monitoring this channel can be used to add accuracy to the present position location functions. Furthermore, it would not be too difficult to modify mobile units utilizing such command channels to be able to report to the supporting infrastructure information about the strength of signals currently being received at the calling unit, and thereby additionally enhance the accuracy of present circular area calculations.

Another contemplated variation or addition is to adapt the existing infrastructure to be able to send out certain signals of progressively decreasing strengths and have the mobile unit receiving such signals feed back information about their received strength up to the point at which contact is lost. This information could be used to calculate a location radius relative to the respective antenna could further improve the accuracy of calculation of the circular area supposedly containing the caller's unit.

In addition to use in public emergency situations, some of the present techniques could be used to fix locations of stolen objects (e.g. automobiles) containing radio transmitters.

Additionally, using above-characterized circular area calculations, network controllers participating in the tracking process can be required to route an emergency call to an emergency center convenient to the most likely location of the caller, using call routing rules fixed locally.

Additionally, callers possessing more than one calling device (e.g. a cellular phone and 2-way pager) could be requested to operate both devices, and information obtained from both (i.e. with different ID's) could be correlated to improve location results.

The foregoing and other features, objectives, advantages and benefits of our invention will be further appreciated by considering the following description and claims.

DETAILED DESCRIPTION

1. Overview of Present System

Figure 1:
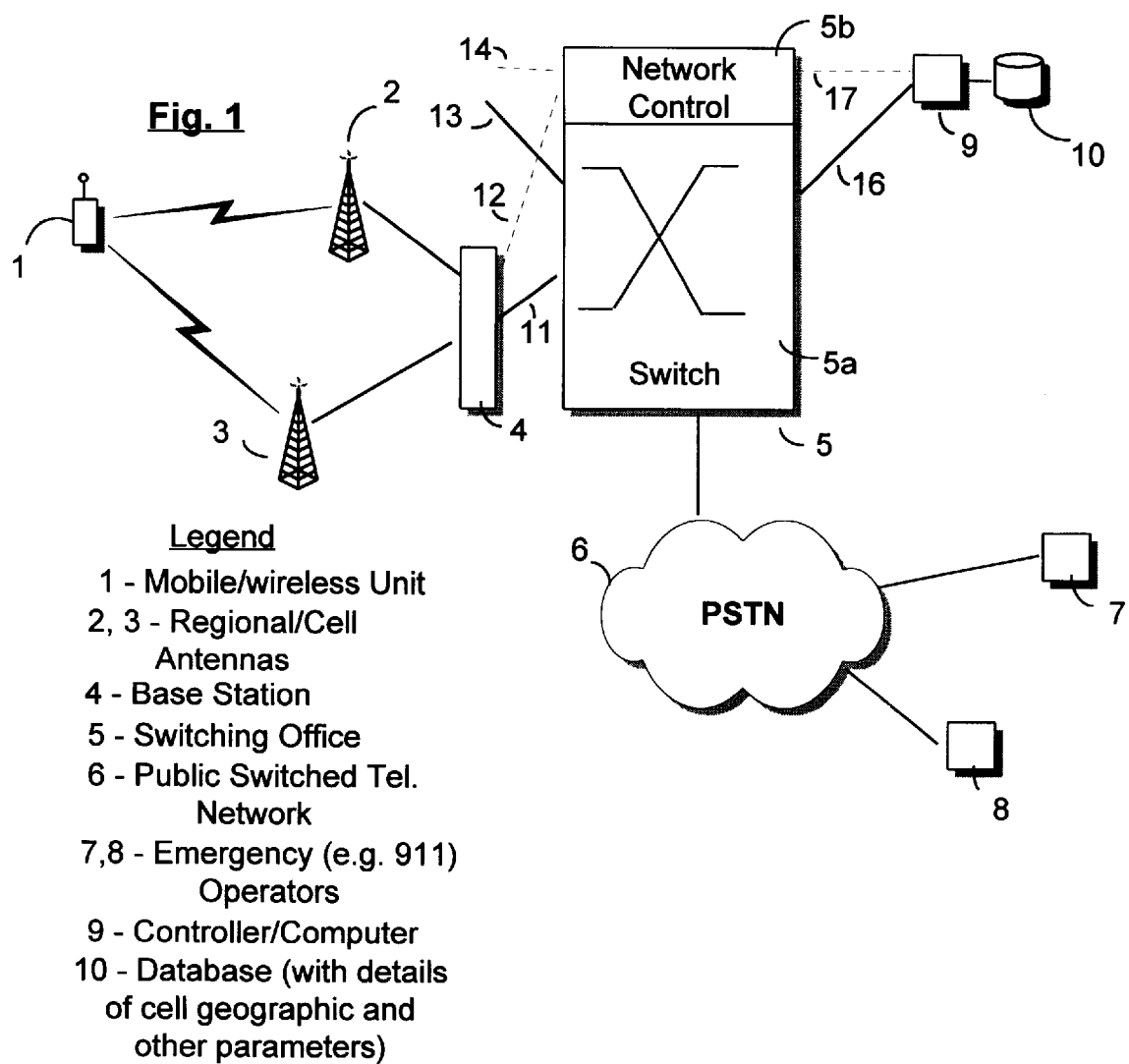
FIG. 1 is an overview of a mobile communication network constructed in accordance with this invention.

FIG. 1 provides an overview of a mobile communication network configured in accordance with this invention. Mobile wireless unit 1 (e.g. a cellular phone) links to two or more antennas 2, 3 within its listening range (two antennas are shown for simplicity, but it is is understood that more of such may be within range). The antennas link to a base station 4 that typically may serve both these (in-range) antennas and other antennas. Each base station such as 4 links to a switching office 5 which may serve additional base stations. Switching office 5 includes a switching section 5a and a network control section 5b. Switching section 5a provides switched connections between base stations and the PSTN (public switched telephone network), the latter shown at 6. Network control section 5b controls section 5a and operating states of base stations such as 2, 3. PSTN 6 provides connections between base stations served by section 5a and telephones within the PSTN, including telephones located at public emergency assistance centers shown at 7 and 8.

Switching office 5 also links to computer 9 having a special database 10 for emergency assistance usage. Computer 9 and its database 10 may be shared by multiple switching offices such as 5.

It should be understood that the network shown in part in FIG. 1 generally would contain more antennas than base stations, more base stations than switching offices, and more switching offices than shared computers such as 9. Thus, use of computers such as 9 and respective databases such as 10 meets present objectives of providing cost-effective emergency assistance with minimal additions to infrastructures of existing wireless mobile communication networks and with minimal expense to users of mobile wireless units utilizing such networks.

There are at least two channels of communication between each office such as 5 and each associated base station such as 4. These include a "data" channel 11, for transferring voice and/or data signals directly between the base station and switching section 5a, and a "control" channel 12 for transferring command and control signals between the base station and network control section 5b. Since each office such as 5 may serve plural base stations, additional data and control channel links to other base stations are suggested respectively at 13 and 14. There are also at least two channels of communication between each office 5 and the shared computer such as 9; including a data channel 16 between switching section 5a and the computer and a control section 17 between network control section 5b and the computer.

Figure 2:
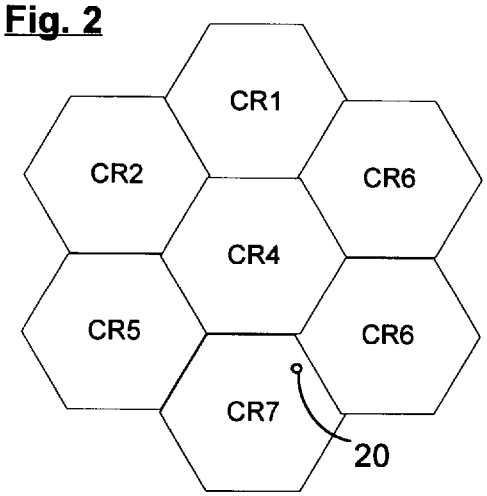
FIG. 2 shows a typical antenna coverage pattern, for handling communications relative to mobile cellular phone units, with a single mobile unit shown at a selected site.
Figure 3:
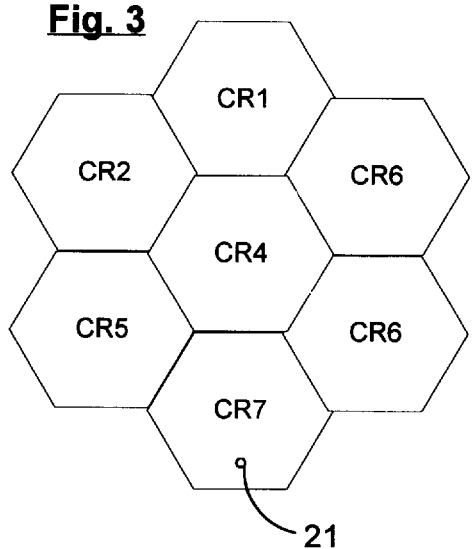
FIG. 3 shows the same FIG. 2 with the mobile unit shown at another site representing a "worst case" situation for emergency location.

Each antenna 2, 3 provides communication coverage over a surrounding cellular region. The coverage is usually omnidirectional so a typical cellular region would have circular form (or some partially circular form if there are mountains or other obstructions within the antenna's range). Typical layouts of circular cellular regions are indicated in FIGS. 2 and 3 discussed below, wherein individual cell regions are labelled CRi (I=1–7). Although these figures show the cell regions as symmetrical and of equal size, it is understood that in general the region shapes and sizes could differ considerably depending upon geographic topology, etc. Although shown here as contiguous for ease of illustration, in practice the cells overlap. Also, although the cells are shown by convention as symmetrical hexagons, in practice they can have other forms depending upon antenna designs and power radiated by them.

Initially, the cells are laid out and tested for area coverage based on terrain, interference (from buildings and other structures), and quality of signal. These areas are carefully characterized by the network provider, and locations of antennas and associated transceiving equipment within each area are precisely determined and recorded. Based on these characteristics, and referring to FIG. 2, it is known that a mobile unit located at position 20 in cellular region CR7, will be sensed by antennas in cellular regions CR7, CR5, CR6, and CR4; and in most cases the supporting network controller will assign primary responsibility for a call to or from that unit to the cell antenna in region CR7. Primary responsibility may be assigned to another cell within sensing range, depending upon traffic conditions and other factors. Primary responsibility refers to the handling of signals representing voice and/or data signals between an antenna and the switching section of a respective switching office via a respective base station. This handling of signals involves tracking identity signals embedded in all transmissions from the mobile unit that is being served. Cells not having primary responsibility, but within sensing range, usually ignore the transmitted ID signals. Such assignment of primary responsibility, regardless of how implemented, does not affect the operation of the present invention; and it is understood that such operation would also be unaffected by concurrent assignment of primary responsibility for one call to plural cells.

Two functions presently considered essential for providing assistance in public emergencies involving mobile wireless units such as 1 are: 1) being able to determine a small area in which the unit is probably located, preferably an area of sufficiently small size to conduct a practical search for locating the unit even if its user is unable to describe his or her location, and 2) being able to provide the user with practical visual cues that may be useful for establishing a more precise location within that small area; for example, being able to question the user as to whether specific terrain, landmarks, building signs, and other structures are visible, and using the user's responses to such questions to narrow the area to be searched (for example a response that a suggested building sign is seen on one side and a suggested structure is seen on another side could be used to further pinpoint his/her location).

The following sections describe how the arrangement shown in FIG. 1 provides these functions of determining a first small area and then providing potentially visible cues to reduce that area to a smaller one.

2. Determining Small Area in Which User/Unit is Located

In accordance with this invention, when a call from a mobile unit involves an emergency situation or the like (e.g. the call is to a public 911 number), a network control 5b associated with antennas in sensing range of the respective unit (or several network controls if the in-range antennas are linked to several controls) assigns secondary tracking responsibilities to plural cells in sensing range of the calling unit. Antennas and base stations of cells having secondary tracking responsibilities monitor ID signals emitted from the mobile unit to be tracked, determine strengths of respective signals, and report respective findings in messages to respective network controls. Cells having primary responsibility perform these same functions and also relay signals representing voice and/or data between the respective unit and the switching section of the respective switching office for transferral to an appropriate emergency assistance center via the PSTN.

Thus, if the unit at position 20 in FIG. 2 is involved in an emergency call, primary tracking responsibility could be assigned to CR7 (the cell receiving the strongest signal from the unit and therefore nearest to the unit), and secondary tracking responsibilities could be assigned to CR5, CR6, and CR4 (cells receiving weaker signals but within sensing range).

Figure 6:
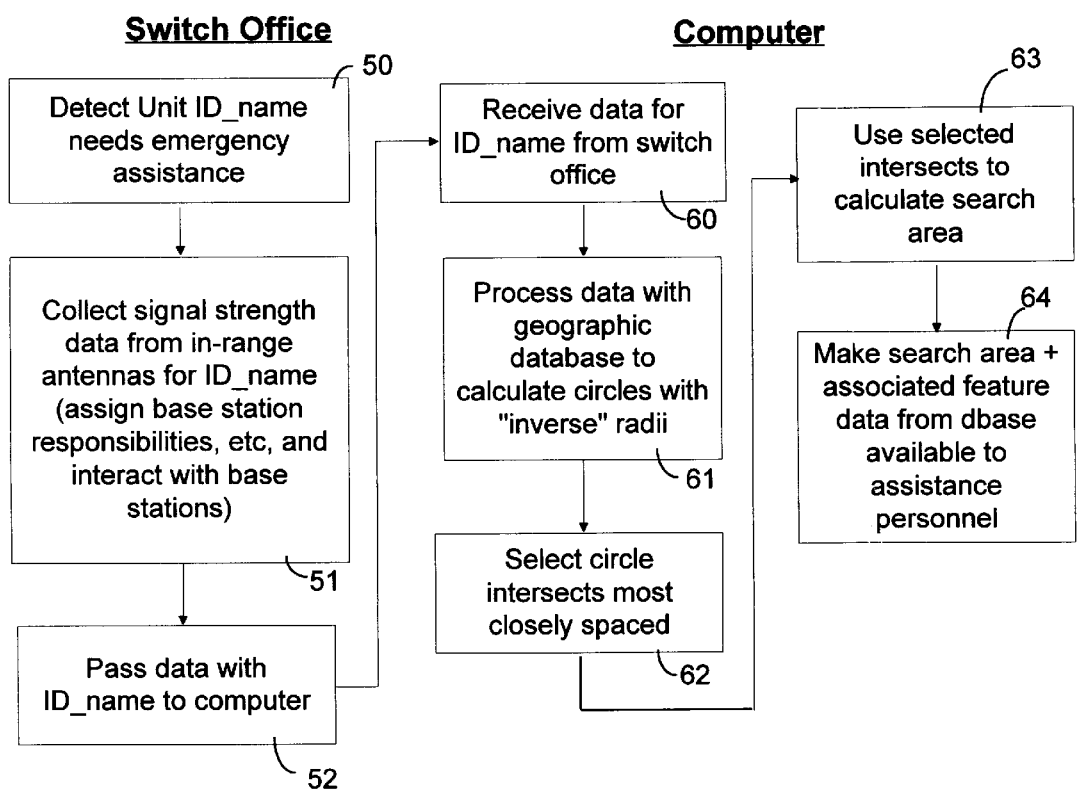
FIG. 6 is a flow chart listing emergency location operation performed by the system of FIG. 1.

As each cell having primary or secondary tracking responsibility detects the ID signal of a unit calling for emergency assistance, the base station serving the cell determines the strength of the signal just received and forwards a message, preferably in digital form, to the respective network control; the message stating the caller ID and signal strength detected. A corresponding message is passed from the network controller to computer 9 for analysis. These operation are summarized in block 50–52 in the chart of FIG. 6. Using map information in its database, including precise locations of all antennas in sensing range, the computer calculates intersections of circles drawn about the sensing sites. These circles have different radii with lengths inversely proportional to signal strengths reported from respective cells (i.e. the circle drawn for the cell reporting the highest signal strength having the smallest radius and the circle drawn for the cell reporting the lowest signal strength having the largest radius). Blocks 60 and 61 in FIG. 6 summarize these circle calculation operations. Choosing a space having the highest density of intersections of these circles, the computer determines a small area to search with a high probability of that area containing the actual site of the calling unit. The selected area is sufficiently small to be subject to a practical search having a high likelihood of quickly locating the caller, assuming the caller is completely unable to describe his/her location.

Figure 4:
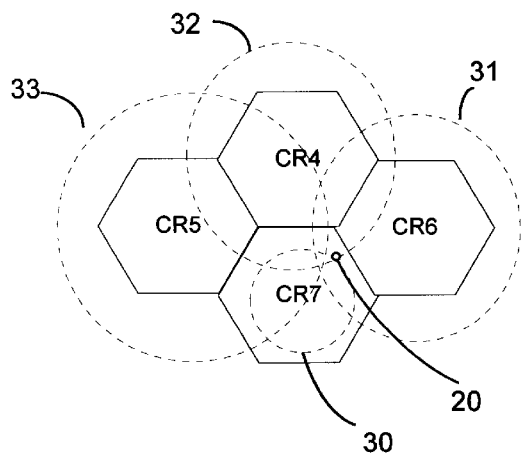
FIG. 4 illustrates a portion of the pattern of FIG. 2 together with circles forming the basis for calculating a "small" area containing the site of the respective mobile unit as shown in FIG. 2.
Figure 5:
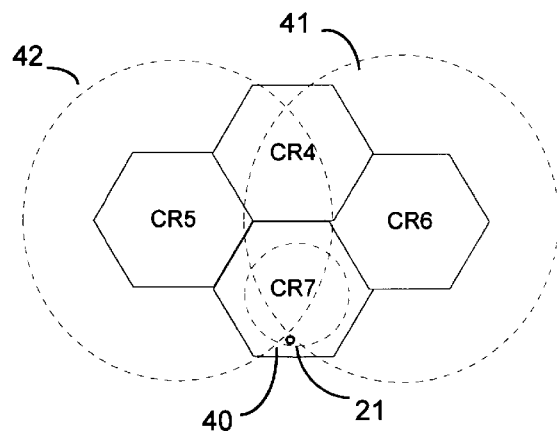
FIG. 5 illustrates a portion of the pattern of FIG. 3 together with circles forming the basis for calculating a "small" area containing the site of the respective mobile unit as shown in FIG. 3.

Circles calculated relative to the cellular coverage pattern of FIG. 2, with an emergency caller actually located at position 20 in that figure, are illustrated in FIG. 4. Circles calculated relative to the same coverage pattern as shown in FIG. 3, wherein the caller is actually situated at a "worst case" position 21, are shown in figure shown in FIG. 5.

For the caller situation of FIGS. 2 and 4, the circle calculated for the strongest signal, that reported from CR7, is a small circle 30 wholly contained within region CR7. In the same situation, the circle calculated from the weaker signals reported from CR6, CR4, and CR5—respectively shown at 31, 32 and 33—have larger radii than circle 30. Examining FIG. 4 closely reveals that these circles have at least 5 intersections clustered close to each other within CR7 and several widely separated intersections located outside CR7 (one in CR4 and two outside all of the in-range regions). It is readily apparent that the cluster of closely spaced intersections is very near to the actual calling site 20 ("very near" in this context meaning at a distance that is very small by comparison to the distances between centers of adjacent cells). Thus, by drawing a small circle containing and slightly larger than the space occupied by the cluster, an area is formed that is both very likely to contain the calling unit and small enough to be quickly searched (e.g. by rescue personnel dispatched to the respective call) with a highly likelihood of having the caller located even if the caller is unable to assist in his/her location. In FIG. 6, this calculation of the geographic area to be searched, based on locations of such clustered intersections, is suggested in blocks 62 and 63, and communication of information describing the area and its distinguishing features is suggested in block 64.

In the "worst case" situation of FIG. 3, the actual location 21 of the calling unit is within CR7, but approximately equidistant from CR5 and CR6, and out of range of CR4. Thus, fewer circles and circular intersections are formed—40, 41 and 42, formed respectively relative to CR4, CR5 and CR6—giving the computer less data to work with in establishing an area subject to practical search. Nevertheless, in this configuration, the computer should find a cluster of three closely space intersections in CR7 below its center, two more intersections in CR7 above the center, and one intersection in CR4 (the latter derived from the circles drawn from signal strengths reported from CR5 and CR6). Proper analysis of this data would lead the computer to select a small area containing the cluster of three intersections as likely to be closest to the actual unit site. Similarly, selection of a small area surrounding this cluster is likely to provide an area encompassing the caller's site that is practical to search.

In any of the foregoing situations, there is some small probability that the search area selected by the computer would not contain the actual call site, but in that circumstance there is a very high likelihood that the actual site is very close to the periphery of the selected area, and that the caller might still be quickly located in a practical search.

Upon selecting a "practical search area" the computer interacts with the respective switching office to communicate related information through the PSTN to the public emergency assistance center (7,8, FIG. 1) at which the respective call is being handled. The related information could for example be a street/road map of the selected area. Such a map would include significant topographic and geographic features of the respective area, and precise location of each feature in the area, as described next.

3. Prompting User With Specific Geographic and Other Cues

Upon selecting a suitable search area, the computer uses its database to determine easily recognizable geographic and topographic features of the selected area (e.g. rivers, hills, buildings, hotels, signs, billboards, gas stations, uniquely colored fences, etc.), and the precise location of each feature (e.g. coordinates thereof within the respective area).

This information, together with information effectively constituting a map of the respective area (e.g. a street and building address map), is communicated via the PSTN to the emergency assistance center to which the call has been assigned.

With this information and map, an operator at the emergency assistance center could ask question the (emergency) caller as to locations of specific features relative to the caller's current location; of the mapped area; e.g. "can you see a "XYZ" company gas station and a billboard from where you are located". If the caller responds affirmatively to any question the position of the caller could then be either precisely determined or at least narrowed to within a very small and specific sub-area of the selected search area. If the caller is unable to identify any feature, the operator could still immediately dispatch rescue personnel with instructions to search the entire selected area; describing boundaries of the selected area to them or telecommunicating the information received from the computer to them.

4. Variations and Enhancements

If the network serving the mobile units contains or is modified to contain steerable antennas, having sensing patterns covering more precisely definable linear areas, the computer could determine precise vector locations getting much closer to the actual calling site, rather than relying on selection of clustered circular intersections.

Most wireless units, both cellular phones and pager units, have a command channel that is "on" or active while the respective unit is active. This feature can be used to enhance the present location determining functions by adapting the command channel to report back strengths of signals currently received in that channel, enabling the computer to more precisely establish the search area. As a further alternative, the antennas could be controlled during appropriate short intervals to provide signals of progressively decreasing strength through this channel, and the units then modified to report back a specific phase in the decrease sequence at which loss of contact occurs. With this type of interaction, the approximate distances between a caller and individual antennas could be determined with greater precision.

Techniques described above for locating emergency callers could readily be modified to locate equipment involved in other situations; for instance, to locate a stolen object such as an automobile carrying a radio which emits signals trackable by appropriately distributed antennas.

Additionally, if the location of the emergency caller can be precisely defined by the calling unit or its user, and if that location is within range of several emergency assistance centers, the call can be routed to one appropriate center based on local rules established between the centers and the mobile switching offices.

Also, if a caller possesses more than one type of mobile unit, e.g. a cellular phone and pager, both units could be activated and tracked and resulting data correlated to establish a more precise basis for calculating a suitable search area.

The invention as described above is considered subject to the following claims.

We claim:

1. For a communication network handling voice communication between wireless mobile units and 911 emergency assistance offices in the public switched telephone network (PSTN)—said communication network including multiple antennas for exchanging radio signals with said mobile units, multiple base stations each serving plural said antennas, and multiple switching offices each serving plural said base stations and having wire-based links to said PSTN—a system for assisting in locating users of said mobile units in response to 911 emergency calls originated by said users at respective said mobile units, said system comprising:

means at said switching offices and base stations for detecting issuance of a 911 emergency call from a specifically identifiable one of said mobile units;

a computer system shared by plural said switching offices; said computer system containing a geographic database including locations of all of the antennas served by all of the base stations served by said plural switching offices sharing said computer system, as well as information about topographic features of geographic areas within signaling range of said antennas;

means at said plural switching offices sharing said computer systems, responsive to detection of issuance of a said 911 emergency call from said identifiable one of said mobile units while the respective unit is actively communicating through plural antennas served by plural base stations, for interacting with respective said plural base stations to gather information about instantaneous strengths of signals being received at those of said plural antennas that are in signal reception range of said unit issuing said 911 emergency call; said means for gathering said signal strength information including means for transferring said gathered information to said computer system;

means responsive to detection of said 911 call and said signal strength information for routing said call to a selected 911 operator assistance station in said PSTN;

said computer system comprising means for utilizing said gathered signal strength information in conjunction with said geographic database for calculating a search area containing said unit issuing said 911 call; said calculated search area having a size sufficiently small to ensure that it would be subject to a practical search even if a user of said unit issuing said 911 call is unable to provide information about their specific geographic location to an assistance operator at said 911 station to which said call is routed, and said computer system including means for communicating information about said search area and topographical features thereof to said emergency assistance operator at said selected station, while a voice call is being handled between said operator and a user of said unit issuing said 911 call; said communicated information being useful by said operator to:

dispatch emergency assistance personnel to said search area and to any specific topographical features therein that is instantly visible to said user of said unit.

2. A system in accordance with claim 1 wherein said database includes specific information about distinguishable physical objects within said calculated search area, in addition to said topographical features, and wherein said computer system includes means for making that specific information about distinguishable physical objects available to said 911 emergency assistance operator.

3. A system in accordance with claim 1 wherein said database includes specific information as to geographic sites of cell antennas, and said means in said computer system for calculating said search area includes:

means for constructing circles of different radii relative to sites of antennas currently in reception range of said unit issuing said 911 call;

said circles having radii whose lengths have inverse relations to signal strengths instantly being received at respective antennas from said unit issuing said 911 call;

means for analyzing intersections of said circles of different radii to locate a cluster of most closely spaced intersections; and means for using said cluster of most closely spaced intersections to define said search area.

4. A system in accordance with claim 1 wherein said information about instantaneous strengths of signals being received by said respective antennas is augmented at least in part by other information indicative of distances between said respective antennas and said unit issuing said 911 call, said other information including information obtained by signaling interaction between said antennas and said issuing unit wherein signals of varying strength are transmitted to said unit evoking responsive transmissions from said unit that are further indicative of respective said distances.

5. A locating system arrangement in accordance with claim 1 including means for determining if a user of a said unit issuing said 911 call has an additional 2-way radio-based signaling unit and including means effective relative to emergency callers having a said additional signaling unit for augmenting signal strength determinations by utilizing communications with both said unit issuing said 911 call and said additional unit for effecting said determinations.

* * * * *

(12) EX PARTE REEXAMINATION CERTIFICATE (7926th)
United States Patent
Dunn et al.

(10) Number: US 5,873,040 C1
(45) Certificate Issued: Dec. 14, 2010

(54) WIRELESS 911 EMERGENCY LOCATION

(75) Inventors: James M. Dunn, Ocean Ridge, FL (US); Edith Helen Stern, Boca Raton, FL (US)

(73) Assignee: Sybase, Inc., Dublin, CA (US)

Reexamination Request:
No. 90/010,796, Feb. 11, 2010

Reexamination Certificate for:
Patent No.: 5,873,040
Issued: Feb. 16, 1999
Appl. No.: 08/698,012
Filed: Aug. 13, 1996

(51) Int. Cl.
*G08B 25/01* (2006.01)
*H04Q 7/38* (2006.01)
*B60R 25/10* (2006.01)
*G01S 5/14* (2006.01)
*G01S 5/00* (2006.01)

(52) U.S. Cl. ..................... 455/456.2; 455/457
(58) Field of Classification Search .............. None
See application file for complete search history.

(56) References Cited

U.S. PATENT DOCUMENTS 5,055,851 A   10/1991   Sheffer
5,959,580 A   9/1999    Maloney et al.

*Primary Examiner*—Ovidio Escalante

(57) ABSTRACT

A system arrangement and method are disclosed for determining location of a wireless mobile unit involved in a call for public emergency assistance (e.g. a "911" call). The system is cost-effective in that it makes extensive use of existing telecommunication infrastructures, and does not require either special hardware or software at either the mobile unit site or the emergency assistance center handling a call. The system features shared use of a computer and specially defined database among a plurality of mobile switching offices serving a larger plurality of mobile base stations, the latter serving an even larger plurality of antenna and transceiving sites within predefined cellular regions. Signal strength measurements at the base stations are passed through the switching offices to a shared computer, and the latter uses the measurements to calculate a small area for which it would be practical to conduct a search if the mobile unit user requiring assistance is unable to help in determining his/her location. The calculated area and database are used to furnish the emergency assistance center handling the call with a detailed mapping of the calculated area, highlighting specific features (terrain, buildings, signs, etc.) that could be used to question the caller in a manner likely to produce responses from which the caller's location could be either precisely fixed or at least narrowed to a small part of the mapped area.

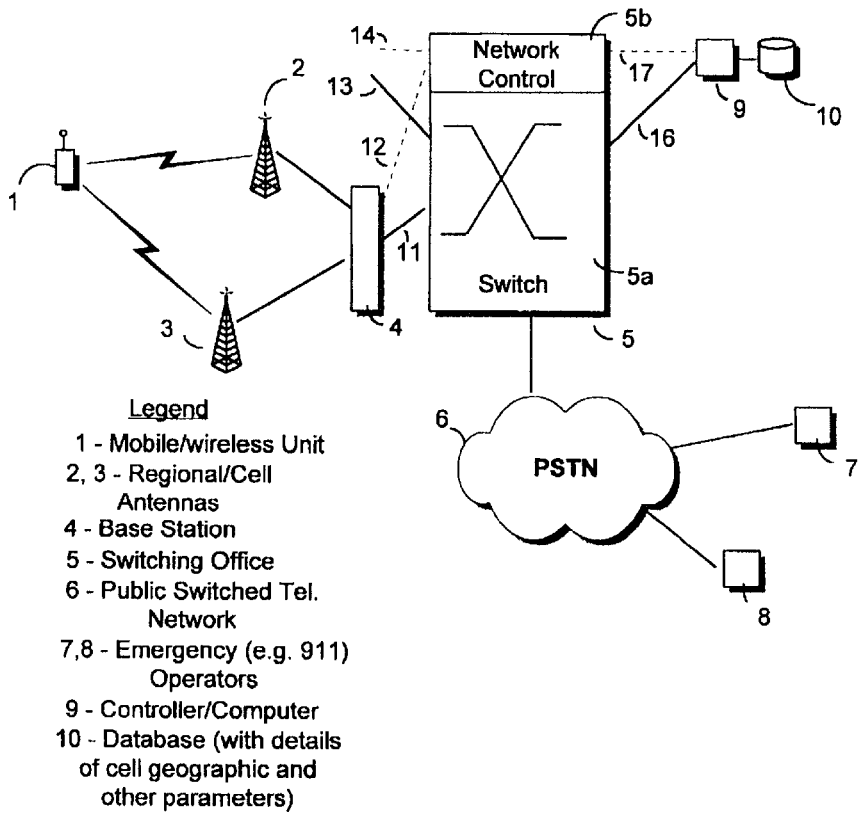

US 5,873,040 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 4 is cancelled.

Claim 1 is determined to be patentable as amended.

Claims 2, 3 and 5, dependent on an amended claim, are determined to be patentable.

1. For a communication network handling voice communication between wireless mobile units and 911 emergency assistance offices in the public switched telephone network (PSTN)—said communication network including multiple antennas for exchanging radio signals with said mobile units, multiple base stations each serving plural said antennas, and multiple switching offices each serving plural said base stations and having wire-based links to said PSTN—a system for assisting in locating users of said mobile units in response to 911 emergency calls originated by said users at respective said mobile units, said system comprising:

means at said switching offices and base stations for detecting issuance of a 911 emergency call from a specifically identifiable one of said mobile units;

a computer system shared by plural said switching offices[;], said computer system containing a geographic database including locations of [all of the] antennas served by [all of] the base stations served by said plural switching offices sharing said computer system, as well as information about topographic features of geographic areas within signaling range of said antennas;

means at said plural switching offices sharing said computer systems, responsive to detection of issuance of [a] said 911 emergency call from said identifiable one of said mobile units while the [respective] *identifiable* unit is actively communicating through plural antennas served by plural base stations, for interacting with respective said plural base stations to gather information about instantaneous strengths of signals being received at those of said plural antennas that are in signal reception range of said unit issuing said 911 emergency call; said means for gathering said signal strength information including means for transferring said gathered information to said computer system;

means responsive to detection of said 911 call and said signal strength information for routing said call to a selected 911 operator assistance station in said PSTN;

*an antenna controller for controlling the multiple antennas during short intervals such that at least one of the multiple antennas provides a sequence of signals of progressively decreasing strength through at least one command channel;* said computer system comprising means for utilizing said gathered signal strength information in conjunction with said geographic database [for calculating] *to calculate* a search area containing said unit issuing said 911 call[;], said calculated search area having a size sufficiently small to ensure that it would be subject to a practical search even if a user of said unit issuing said 911 call is unable to provide information about their specific geographic location to an assistance operator at said 911 station to which said call is routed, [and]

*wherein the means for calculating the search area containing said unit issuing said 911 call uses information received from the mobile unit via the at least one command channel, the information identifying at least one phase in the sequence of signals of progressively decreasing strength where loss of contact occurs; and* said computer system including means for communicating information about said search area and topographical features thereof to said emergency assistance operator at said selected station, while a voice call is being handled between said operator and a user of said unit issuing said 911 call; said communicated information being useful by said operator to:

dispatch emergency assistance personnel to said search area and to any specific topographical features therein that is instantly visible to said user of said unit.

* * * * *